United States Patent [19]
Smith et al.

[11] 3,935,392
[45] Jan. 27, 1976

[54] DIAL PULSE DETECTION METHOD AND APPARATUS

[76] Inventors: Lloyd M. Smith; Robert E. Webb, both of 3771 Harts Mill Lane, Atlanta, Ga. 30319

[22] Filed: Jan. 17, 1974

[21] Appl. No.: 434,013

[52] U.S. Cl.............................. 179/16 EA; 328/164
[51] Int. Cl.² ......................................... H04Q 1/36
[58] Field of Search .......... 328/109, 110, 115, 117, 328/129, 130, 146, 149, 164; 179/16 E, 16 EA, 84 R, 84 NF

[56] References Cited
UNITED STATES PATENTS

| | | | |
|---|---|---|---|
| 3,092,691 | 6/1963 | Burns et al. | 179/16 EA |
| 3,219,762 | 11/1965 | Abbott | 179/84 R |
| 3,452,220 | 6/1969 | Fritschi | 179/16 E |
| 3,497,815 | 2/1970 | Turner | 328/109 |
| 3,737,790 | 6/1973 | Brown | 328/115 |
| 3,743,950 | 7/1973 | Sellari et al. | 328/146 |
| 3,781,482 | 12/1973 | Wisotzky et al. | 179/16 EA |
| 3,794,775 | 2/1974 | Hicks et al. | 179/16 EA |
| 3,892,926 | 7/1975 | Edwards et al. | 179/16 EA |

*Primary Examiner*—Kathleen H. Claffy
*Assistant Examiner*—Randall P. Myers
*Attorney, Agent, or Firm*—Jones, Thomas & Askew

[57] ABSTRACT

Apparatus and method for detecting the occurrence of a dial pulse signal in a telephone circuit. Transient signals within the frequency range of possible dial pulse signals are detected, and the amplitude of the detected signals are compared with a predetermined amplitude level. A first time period and a second time period are initiated in response to a first detected signal which exceeds a certain initial reference amplitude, with the duration of the first time period being less than the interval between the two consecutive transient pulse signals to be expected of a true dial pulse signal. The duration of the second time period is substantially equal to the period of a true dial pulse signal. A received signal resembling a dial pulse signal is detected during the first period only if the amplitude of such signal exceeds a second reference amplitude which is greater than the initial reference amplitude. A second apparent dial pulse transient signal condition, occurring after the termination of the first time period but before the termination of the second time period, is interpreted as the occurrence of a true dial pulse signal, in response to which a corresponding dial pulse output signal is produced. A second apparent dial pulse transient signal condition occurring in the first time period, however, merely extends the duration of the first time period and provides no dial pulse output signal. An amplitude comparison circuit automatically adjusts the reference amplitude in response to the signal level of the circuit providing input signals to the apparatus.

13 Claims, 3 Drawing Figures

DIAL PULSE DETECTION METHOD AND APPARATUS

This invention relates in general to a pulse detection apparatus and method, and in particular to apparatus and method for detecting telephone dial pulse signals.

It is frequently desired to be able to transmit digital information over a conventional telephone circuit without the need for any special-purpose digital input equipment or any equipment other than a conventional dial telephone. Those skilled in the art will recognize many applications for direct input of data on a dialled telephone circuit. For example, it is already known to effect remote control of equipment through the use of dialled digits to which are assigned certain corresponding operational commands to be followed by the equipment. A specific example of the foregoing is found in certain types of remote dictation equipment which is connected to a subscriber's telephone circuit to accept dictation from anyone calling that circuit. The command control functions associated with conventional dictation equipment, such as "dictate," "reverse," "listen," and "stop" are obtained by inputting the appropriate corresponding unique digits assigned to each of these (and possibly other) functions.

Many other types of equipment are known or can be suggested which are operable in response to relatively simple input signals, and which are thus adaptable for operation by digital signals accurately transmitted over telephone lines. By way of further example, it is presently suggested that various consumer banking functions could be accomplished by dialled interface with the bank's computer, properly programmed for response to appropriate input signals.

Still another application calling for the accurate transmission of digital signals over telephone circuits is found in so-called "dial-through" telephone equipment which is connected to a subscriber's first telephone circuit and which is operative, in response to a ringing input signal on the first telephone circuit to connect that circuit to a second telephone circuit, so that the calling party can dial a second number which is received on the first circuit and automatically dialled-out on the second circuit to call a desired party.

Telephones of the type frequently referred to as Touchtone telephones, generate a unique tone frequency or combination of tone frequencies for each individual dialled digit, and these frequencies are readily detected and identified by conventional frequency-separation circuits, connected to a dialled subscriber telephone, for utilization. The majority of telephones currently in use, however, utilize the conventional rotary dial to generate dial pulses for operation of the telephone switching equipment. The conventional rotary dial is a make-break device which sequentially opens and closes a direct-current circuit in the telephone line a number of times corresponding to a dialled digit. The make-break action of the rotary dial transmits a series of direct-current dial pulse conditions along the telephone line to the central office, whereat the direct-current pulses are utilized for switching purposes.

Those skilled in the art will recognize that a direct-current transmission path does not exist between two subscriber telephones interconnected by conventional central office equipment. The direct-current dial pulses are, instead, presented at the receiving end of a telephone transmission network as repetitive transient signal conditions resulting from the approximate square-wave nature of the original direct-current pulses. The conventional rotary dial, when released from a dialled number N, breaks the telephone line N times, with each break lasting 60 milliseconds (ms) followed by a "make" lasting for 40 ms. Each "make" and "break" generates transient signals within the speech-frequency transmission capability of the telephone circuit, and so the telephone circuit transmits the transient signal pulse bursts of the breaks and the makes so that the received signal is a series of transient pulse bursts approximately 60 ms apart, occurring every 100 ms.

It can be seen that a rotary dial pulse can be recognized by detecting these bursts of transient pulses spaced approximately 60 ms apart. In actual practice, however, the dial pulse signals tend to be buried in the general background noise of the telephone circuit. The dial pulse bursts tend to be distorted from their original state because the higher-frequency components of the square-wave pulses cannot be transmitted over the conventional telephone circuit.

Prior art attempts have been made to provide equipment which detects dial pulses. Such equipment, sometimes referred to as "click counters," has been generally unable to detect dial pulses in a dependable and repeatable manner. Such prior-art dial pulse detection equipment has been particularly unsatisfactory for use as a component of dial-through equipment, since a dial pulse burst which is lost, or a noise burst which is misidentified as a dial pulse, will result in a misdialled number in the dialthrough operation. The operational deficiencies of prior-art dial pulse detection equipment have generally resulted from a number of problems, including the inability of the equipment to be relatively insensitive to randomly-occurring transient noise signals which are not true dial pulses but which nevertheless resemble a dial pulse transient pulse burst in frequency and duration, as well as the inability of such equipment to adjust itself automatically to the various ambient signal levels which are present on different telephone circuits and/or at different times.

Accordingly, it is an object of the present invention to provide improved apparatus and method for dial pulse detection.

It is another object of the present invention to provide dial pulse detection apparatus and method which is relatively insensitive to noise conditions resembling dial pulse transient signals.

It is yet another object of the present invention to provide dial pulse detection apparatus and method which automatically adapts to changeable input circuit conditions.

These and other objects and advantages of the present invention will become more readily apparent from the following description of an illustrative embodiment thereof, including the drawing in which.

Stated in general terms, dial pulse conditions are detected according to the present invention by being sensitive to the detection of a first transient signal which resembles a dial pulse burst and which may be the first of a pair of pulse bursts caused by and corresponding to a true dial pulse, and then being relatively insensitive to similar pulse bursts for a portion of the period of time which separates the aforementioned two pulse bursts of a true dial pulse. If another transient signal resembling a dial pulse signal occurs and is detected during this time period, at least one of the pulses is spurious and is rejected as not corresponding to a true dial pulse signal. After the time period expires, signals having the amplitude and frequency characteristics of a dial pulse signal, if detected in proper time, result in the generation of an output signal signifying the detection of a true dial pulse. The amplitude of incoming signals is compared with an average amplitude determined by telephone line signal conditions, and the time constant of the amplitude comparison circuit is controlled in response to detection of initial possible dial pulse condition.

Figure 1:
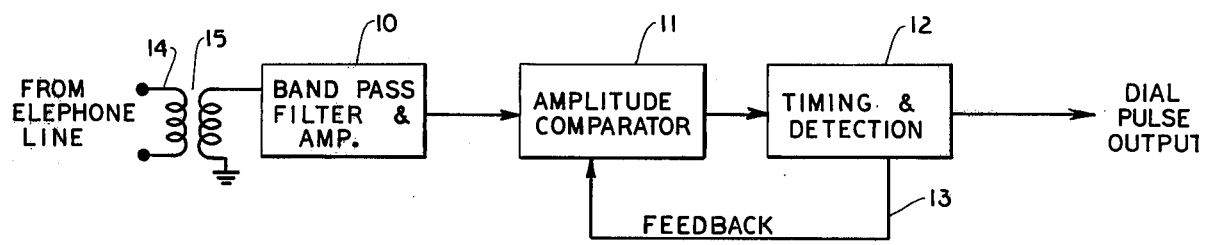
FIG. 1 shows a block diagram of a disclosed embodiment of apparatus illustrating the present invention.

The apparatus and method of the present invention are better understood with reference to the disclosed illustrative embodiment as depicted in the Figures. Referring first to FIG. 1, there is shown an embodiment of apparatus according to the present invention and including a bandpass filter and amplifier indicated at 10, an amplitude comparator circuit indicated at 11 and connected to receive the output of the bandpass filter and amplifier 10, and a timing detection circuit 12 connected to receive the output of the amplitude comparator. A feedback circuit 13 extends from the timing and detection circuit 12 to the amplitude comparator circuit 11. The bandpass filter and amplifier 10 is connected to receive input signals from a conventional telephone line 14, and the connection may include a conventional transformer 15 to isolate the present apparatus from the telephone line. Where dial pulse detection apparatus of the type described herein is used in association with a dial-through system, for example, it will be understood that the telephone line 14 is provided by signal connection with a subscriber's telephone circuit which would include the elements of a conventional telephone set; such conventional elements form no part of the present invention and are not described herein.

The bandpass filter and amplifier 10 provides the dual function of amplifying the signals received from the telephone line 14, including possible dial pulse signals, and limiting the signals to a particular pass band in which occurs a substantial portion of the spectrum of energy in each dial pulse transient pulse burst. Although higher-frequency components may exist in the dial pulse burst, the use of a bandpass filter provides a more consistent waveform on which the remaining circuits of the apparatus can operate, and additionally eliminates transient noise conditions occurring outside of the pass band. It has been found that a pass band of approximately 300–500 hz is acceptable in apparatus constructed according to the present invention. A particular example of a bandpass filter and amplifier 10 is provided by a conventional operational amplifier bandpass filter of design known to those skilled in the art. Such a filter, designed for use in the present invention, can have the aforementioned passband along with a gain of about 12 db. It should be understood that the foregoing values of amplification gain and passband are set forth herein by way of example only, and are not intended to limit the present invention to a bandpass filter and amplifier having the specific stated values.

Figure 2:
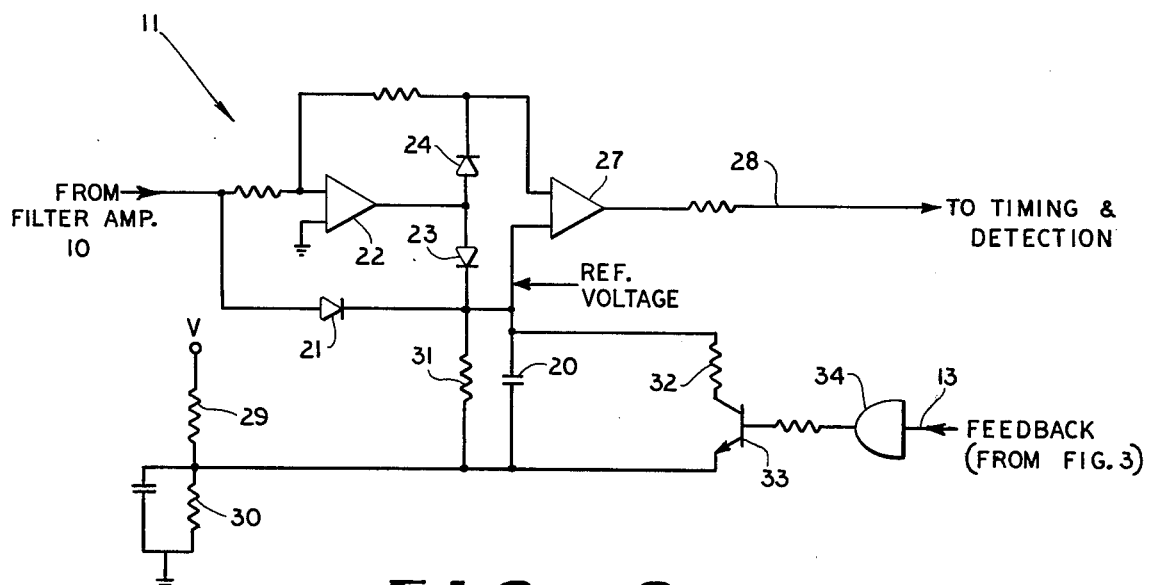
FIG. 2 is a schematic drawing showing an amplitude comparator as depicted in FIG. 1.

The amplitude comparator 11 accepts the amplified and filtered signals from 10 and provides a comparison of instantaneous input signal level with an average reference signal level which is also determined, in part, by signals received from the bandpass filter and amplifier. The amplitude comparator 11, as shown in FIG. 2, includes a reference capacitor 20 which is connected to receive positive pulses from the filter-amplifier 10 by way of the diode 21, and to receive negative signal pulses by way of the operational amplifier 22 and the diode 23. The diode 24 provides an open feedback path to positive pulses. It can be seen that the diode 21, the operational amplifier 22, and the diode 23 function as a full wave rectifier to charge the capacitance 20 in response to signals supplied from the filter-amplifier 10.

The input of the operational amplifier 27 is connected to the reference capacitance 20 and to signals from the filter-amplifier 10, to provide an output signal on the line 28 whenever the instantaneous amplitude of a signal from the filter-amplifier exceeds the reference voltage on the reference capacitance. The reference capacitance 20 initially is charged to a nominal reference voltage which is established by the resistances 29 and 30. A pulse of M volts (for example) from the filter-amplifier 10 will cause the reference voltage on the reference capacitance 20 to momentarily change to M volts less one diode drop. This additional increment of reference voltage charge on the reference capacitance 20 will discharge through the resistance 31 back to the nominal reference voltage, assuming the absence of additional signals from the filter-amplifier, with a time constant determined by the values of the reference capacitance 20 and the resistance 31.

The time constant of the circuit including the reference capacitance 20 is selectively changed by the parallel circuit including the resistance 32 and the transistor switch 33. The transistor switch 33 is operated in response to a signal on the feeback circuit 13, in a manner described below. It will be seen that the transistor switch 33, when operated to provide a closed circuit, places the resistance 32 in parallel with the resistance 31 and thereby reduces the time constant of the RC circuit including the reference capacitance 20. An actual embodiment of apparatus according to the present invention utilizes a reference capacitance 20 of 1 mfd, a resistance 31 of 100,000 ohms, and a resistance 32 of 12,000 ohms, providing a time constant of 100 ms with the transistor 33 in the "off" or open-circuit state and a time constant of 10.7 ms with the transistor switch 33 in the "on" or closed-circuit state.

It can be seen from the foregoing description that the operational amplifier 27 provides an output of the amplitude comparator only when the instantaneous amplitude of signals received from the filter-amplifier 10 exceed the reference signal amplitude on the reference capacitance 20. This reference signal amplitude is a function of the nominal reference signal provided by the resistances 29 and 30, along with an additional increment of reference amplitude determined by capacitance charging with signals from the filter-amplifier 10. It will be seen, accordingly, that the reference capacitance 20 maintains a reference voltage which is determined by the average amplitude of signals arriving on the telephone line 14. The amplitude comparator 11 provides an output signal only in response to received signals which exceed the reference signal, and so it is seen that the amplitude comparator circuit 11 provides a self-adjusting reference signal which adjusts to variations in signal and noise amplitude present on the telephone line 14. When an input signal on the telephone line, as amplified and filtered at 10, exceeds the reference signal on the capacitance 20 at that time, an output signal is applied on the line 28 and the capacitance 20 becomes charged to a higher level determined by the amplitude of the received input signal. The increased charge on the reference 20 returns to the nominal reference level, or to a greater level determined by subsequent input signals, at a rate determined by the state of the transistor switch 33.

Figure 3:
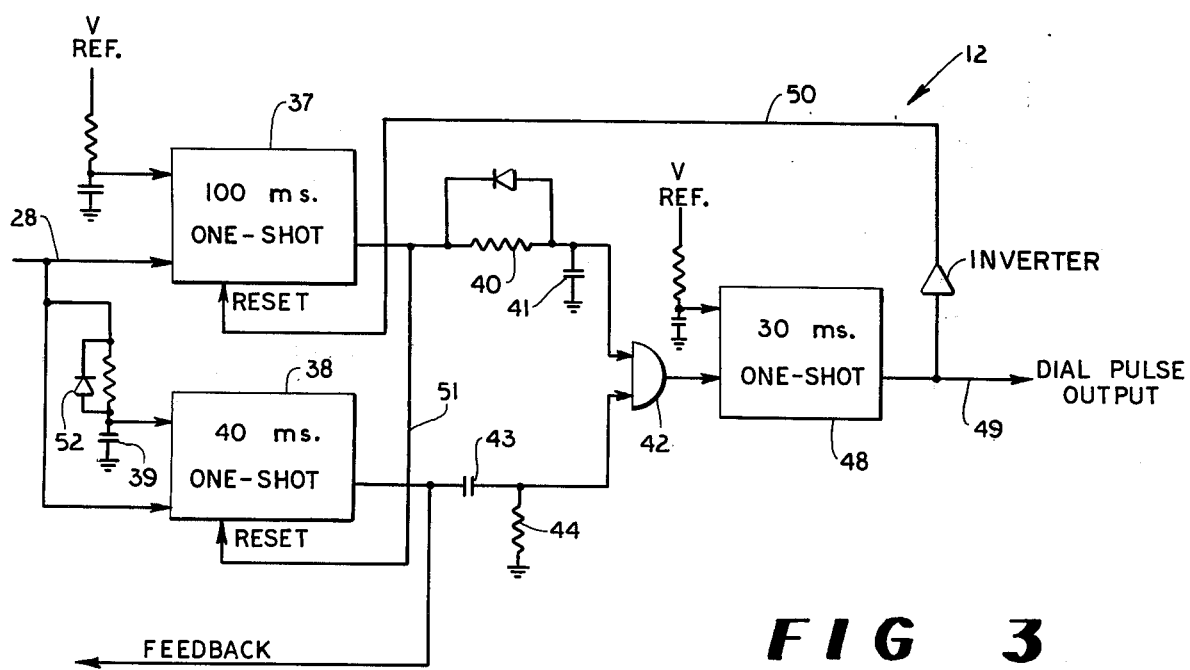
FIG. 3 is a schematic diagram of a timing and detection circuit as depicted in FIG. 1.

Turning next to the timing and detection circuit 12 as shown in FIG. 3, it is seen that output signals supplied on the line 28 by the amplitude comparator circuit 11 are connected to trigger a pair of one-shot circuits 37 and 38. The one-shot 37 has a normal operating time of 100 ms and the one-shot 38 has a normal operating time of 40 ms, but either of these operating times may be shortened by a signal applied to the respective reset inputs of the one-shots. The operating time of the 40 ms one-shot 38 may be extended by preventing the corresponding timing capacitance 39 from becoming fully charged, as explained below.

The 100 ms output pulse from the one-shot 37 is delayed by a delay circuit which, in the disclosed embodiment, is provided by the resistance 40 and the capacitance 41 connected to integrate the output of the one-shot 37. The delayed output of the one-shot 37 is applied as one input to the AND gate 42.

The 40 ms output of the one-shot 38 is differentiated by the capacitance 43 and the resistance 44, and this differentiated output is applied as a second input to the AND gate 42. The undifferentiated output from the 40 ms one-shot 38 is also applied to the feedback circuit 13 to control the operation of the transistor switch 33 in the amplitude comparator circuit 11.

The AND gate 42 is operative, in response to coincident input signals applied to its two input circuits, to trigger operation of the 30 ms one-shot circuit 48. The output of the one-shot circuit 48 provides a signal which is applied on the line 49 as a dial pulse output, corresponding to the detection of a "true" dial pulse. The output of the one-shot circuit 48 is also inverted and supplied along the line 50 to the reset input of the 100 ms one-shot 37.

The reset input of the 40 ms one-shot 38 is connected by the line 51 to receive the output of the 100 ms one-shot 37 as a reset signal. The timing capacitance 39 associated with the 40 ms one-shot 38 is connected through the diode 52 to receive signals present on the line 28.

The operation of the disclosed embodiment is now considered. A pulse burst signal which occurs on the telephone line 14 and which falls within the passband of the filter-amplifier 10 is amplified and applied to the input of the amplitude comparator circuit 11. If this input signal exceeds the reference signal seen by the operational amplifier 27, as described above, an output signal appears on the line 28 and triggers both the 100 ms one-shot 37 and the 40 ms one-shot 38. This first pulse from the amplitude comparator 11 is considered a "maybe" pulse, and the timing and detection circuit 12 will not output a "true" dial pulse unless a second pulse burst (also resembling a dial pulse) occurs after a 40 ms "quiet period" and within 100 ms of the "maybe" pulse.

Triggering of the 40 ms one-shot 38 immediately applies a signal on the feedback line 13, which signal is inverted at 34 (FIG. 2) to turn the transistor switch 33 "off." The reference capacitance 20, which received an incremental charge signal in response to the pulse burst signal corresponding to the "maybe" pulse, now discharges at the relatively slow rate controlled by the 100 ms time constant and thus substantially maintains the increased reference charge signal for the duration of the 40 ms time period of the one-shot 38. It will be seen that the increased reference signal on the reference capacitance 20 provides a "quite period" during which the operational amplifier 27 is prevented from being triggered by signals having an amplitude less than the amplitude of the first apparent dial pulse signal, so that "ringing" signals from the first pulse will be ignored by the apparatus.

The 40 ms pulse from the one-shot 38 is immediately differentiated by the capacitance 43 and the resistance 44 to provide an input to the AND gate 42, while the 100 ms output from the on-shot 37 is delayed by resistance 40 and capacitance 41. Because of the delay and differentiation, the AND gate 42 fails to receive coincident input signals and the one-shot 48 is not triggered. It will be seen, accordingly, that the occurrence of the first apparent dial pulse burst sets the timing and detection circuit 12 to a "maybe" state.

Assuming that no signal exceeding the increased reference charge on the reference capacitance 20 is received from the filter-amplifier 10 during the 40 ms pulse of the one-shot 48, the termination of this pulse allows the transistor switch 33 to be turned "on" so that the increased reference charge on the capacitance 20 is allowed to fall relatively rapidly. If the first apparent dial pulse burst was in fact generated by a dial pulse, the second pulse burst will occur approximately 60 ms after the first apparent pulse burst and this second pulse burst will again trigger the 40 ms one-shot 38. The AND gate 42, which by this time is receiving the delayed output of the 100 ms one-shot 37, now also receives the differentiated 40 ms signal and provides a trigger signal to the 30 ms one-shot 48 in response to the coincident of inputs. The 30 ms signal applied on the line 49 provides a "true" square-wave dial pulse output for appropriate utilization. This 30 ms signal is also applied to the reset input of the 100 ms one-shot 37 and, hence, blanks the timing and detection circuit 12 for 30 ms.

If, following termination of the 40 ms pulse triggered by the first apparent dial pulse burst, no subsequent pulse is received which exceeds the reference signal of the amplitude comparator 11, the system remains in a "maybe" state until termination of the 100 ms period of the one-shot 37. Upon termination of the 100 ms period without receipt of a second apparent dial pulse burst following the 40 ms "quiet period," the timing and detection circuit reverts to its initial state to await a new "maybe" pulse.

If a first apparent dial pulse burst is prematurely followed, less than 40 ms later, by another apparent dial pulse burst which exceeds the increased reference signal on the reference capacitance, the signal applied to the line 28 by this premature subsequent signal causes the timing capacitance 39 of the one-shot 38 to become discharged through the diode 52, thereby extending the timing duration of the one-shot 38. Since the occurrence of a pulse burst during the 40-ms "quiet period" is obviously too soon to be the second pulse burst of a true dial pulse, the timing and detection circuit 12 ignores this spurious apparent dial pulse.

From the foregoing description of the illustrative embodiment, it can be seen that the dial pulse detection apparatus and method of the present invention provides a "true" dial pulse indication only in response to pulse bursts which fit the timing criteria of legitimate dial pulses. The reference signal of the amplitude comparator automatically adjusts to varying telephone line ambient level conditions, so that the dial pulse detection apparatus of this invention can be connected to various telephone circuits without requiring individualized adjustment to accommodate the conditions of a particular circuit, and without being confused by fluctuations of the ambient signal level. The present dial pulse detection method and apparatus functions so that N legitimate serially-received dial pulses generate N serial true dial pulses.

Although the foregoing is set forth as a full and complete description of a disclosed embodiment of the present invention, it will be apparent to those skilled in the art that numerous alterations and modifications may be made therein without departing from the spirit and the scope of the present invention as defined in the following claims.

What is claimed is:

1. Apparatus for detecting the occurrence of a dial pulse signal which consists of first and second signal portions separated by a known period of time and having characteristic transient signal conditions, comprising:

means for receiving input signals which may include as dial pulse signal and operative in response to each input signal which exhibits such characteristic transient signal conditions to provide an enabling signal condition which denotes the occurrence of what may be one of such dial pulse signal portions;

first means responsive to said enabling signal condition to provide a first control signal condition which commences a delayed time after said enabling signal condition occurs and which continues for a first time period substantially equal to a complete dial pulse signal;

second means responsive to said enabling signal condition to provide a second signal condition for a second time period equal to at least a portion of such known separation time between the first and second signal portions of a dial pulse signal; and coincidence means responsive to the initiation of a said second control signal condition at a time when a said first control signal condition is present to provide an output signal condition corresponding to the occurrence of a dial pulse, so that such output signal conditions can occur only when a second control signal condition provided in response to a second such signal portion is initiated during the period of a first control signal condition provided in response to a first such signal portion.

2. Apparatus as in claim 1, wherein said means for receiving input signals is operative in response to the absence of said second control signal condition to provide a said enabling signal condition in response to an input signal which exhibits said characteristic transient signal conditions and which exceeds a first minimum amplitude, and is operative in response to the presence of said second control signal condition to provide a said enabling signal condition only in response to an input signal which exhibits said characteristic transient signal conditions and which exceeds a second minimum amplitude greater than said first minimum amplitude.

3. Apparatus as in claim 2, wherein said second means is operative in response to a said enabling signal condition which occurs during a said second time period to extend the duration of that said second time period.

4. Apparatus as in claim 1, further comprising third means responsive to said output signal condition to render said first means and said second means inoperative for a certain period of time.

5. Apparatus as in claim 1, wherein:

said coincidence means comprises differentiation circuit means operative to provide a pulse of momentary duration in response to the initiation of each said second control signal condition;

said first means includes integration circuit means operative to provide said delayed commencement of said first control signal condition after the momentary duration of said momentary pulse; and said coincidence means is responsive to the concurrent occurrence of a said momentary pulse and a said delayed first control signal to provide said output signal condition corresponding to the occurrence of a dial pulse.

6. Apparatus as in claim 1, wherein:

said means for receiving input signals includes a reference voltage circuit and is operative to provide a said enabling signal condition whenever an input signal which exhibits said characteristic transient signal conditions exceeds a reference voltage determined by said reference voltage circuit;

said reference voltage circuit is operative to maintain a nominal reference voltage in the absence of such an input signal and is responsive to such an input signal which exceeds said nominal reference voltage to assume an increased reference voltage which is determined by the amplitude of said input signal;

said reference voltage circuit including circuit means selectively operative to adjust said increased reference voltage to said nominal reference voltage at either a first rate or at a second rate; and said circuit means being responsive to said second control signal condition to adjust said reference voltage at said second rate during said second time period.

7. Apparatus as in claim 6, wherein said circuit means is operative at said second rate to substantially maintain said increased reference voltage for the duration of said second time period.

8. Method of detecting the occurrence of a dial pulse characterized by first and second signal portions separated by a known period of time and having characteristic transient oscillatory signal conditions, comprising the method steps of:

detecting the occurrence of a first input signal which exhibits said characteristic transient oscillatory signal condition and which may be the first one of such dial pulse signal portions;

detecting the occurrence of a premature second input signal which exhibits said characteristic transient oscillatory signal condition and which may be the second one of such dial pulse signal portions and which occurs during less than said known period of time after said detection of the first such input signal;

detecting the occurrence of a true second input signal which exhibits said characteristic transient oscillatory signal conditions and which may be said second one of such dial pulse signal portions and which occurs after said known period of time after said detection of the first such input signal; and providing a detected dial pulse output signal if said detection of said true second input signal follows said detection of said first input signal without the intervening detection of said premature second input signal.

9. The method as in claim 8, comprising the additional step of being nonresponsive to any input signal occurring during a predetermined period of time after said detected pulse output signal is provided.

10. The method as in claim 8, wherein a premature second input signal is detected only if such premature input signal exceeds a second minimum amplitude which is greater than a minimum amplitude for detection of said first input signal.

11. The method as in claim 10, wherein said second minimum amplitude is directly proportional to the amplitude of said detected first input signal.

12. The method as in claim 8, wherein a premature second input signal is detected during less than said predetermined period of time only if such premature input signal exceeds a minimum amplitude which is greater than a minimum amplitude for detection of said first input signal; and a true second input signal is detected if such true second input signal exceeds a minimum amplitude which is less than said minimum amplitude for said premature second input signal.

13. Apparatus for detecting the occurrence of a dial pulse signal characterized by a pair of signal portions separated by a known period of time and having identifiable characteristic signal conditions, comprising:

means for receiving input signals which may include a dial pulse signal and operative in response to each input signal which exhibits such characteristic signal conditions to provide an enabling signal condition which denotes the occurrence of what may be one of such dial pulse signal portions;

first timing means operative in response to a first said enabling signal condition to provide a first control signal condition for a first time period which extends for at least said known separation time between the signal portions of a dial pulse signal;

second timing means operative in response to said enabling signal condition to provide a second control signal condition for a second time period which is less than said known separation time;

first means responsive to said first and second control signal conditions to provide a detected dial pulse output signal condition in response to a second control signal condition provided by a second said enabling signal condition which occurs coincident with said first time period and after termination of said second time period; and second means responsive to a second said enabling signal condition which occurs coincident with said first and second time periods to prevent occurrence of a detected dial pulse output signal, so that no dial pulse signal is detected notwithstanding the occurrence of said first enabling signal condition.

* * * * *